United States Patent Office 2,836,494
Patented May 27, 1958

2,836,494

PHOTOGRAPHIC EMULSIONS AND ELEMENTS

Joseph De Witt Overman, Eatontown, N. J., assignor to E. I. du Pont de Nemours and Company, Wilmington, Del., a corporation of Delaware No Drawing. Application January 14, 1957
Serial No. 633,837

14 Claims. (Cl. 96—87)

This invention relates to photographic emulsions and emulsion layers and to photographic film elements embodying the same. More particularly, it relates to such emulsion layers and elements having improved physical properties when subjected to elevated temperature conditions.

With the advent of the new projection techniques and equipment such as wide screen and outdoor motion picture theaters, more powerful projector light sources are required. This has resulted in a vast increase in the radiant energy to which a film being projected is exposed. An explanation of how this heat energy has increased may be found in Carver et al., "Effect of High-Intensity Arcs," J. S. M. P. E. 41, 1943, pages 69–87, and Kolb, "Air Cooling of Film," J. S. M. P. E. 53, 1949, pages 635–664. As pointed out by these references, this range of energy has caused difficulty even with the lower intensity arc lamps. The heat energy shortens the life of cine films by causing blistering of the emulsion layer with subsequent deterioration of the silver image. With the use of more powerful projector light sources, the above difficulties have increased to a substantial degree. Blistering of the conventional colloid emulsion layer and its subsequent deterioration has become particularly objectionable. The gelatin in a normal gelatin-silver halide emulsion is especially sensitive to such intense heat and to changes from normal room temperature and normal humidity to very high temperatures and very low humidity. Such sensitiveness causes the film element to behave in a sometimes unpredictable and undesirable manner in addition to the above described blistering and deterioration.

As described in the above references, motion picture film never passes through the film gate of a projector in a perfectly flat plane, but assumes a slightly concave shape on the emulsion side facing the light upon entering the film gate and then during the projection the frame changes to a convex shape under the influence of the radiant energy from the arc light. The concave shape is referred to as positive curl and the convex shape is referred to as negative curl. When a film has a positive curl during projection, the projecting lens in order to provide a sharp image on the screen must be adjusted to a positive focus setting or slightly farther away from the source of light than it would have to be if the film in the gate were perfectly planar. The opposite holds true when the film assumes a negative curl and this is referred to as negative focus. This change in planarity has been designated by several terms depending on the nature of the non-planarity. For example, practically all cine projection films require a change of focus setting from one projection of a reel to the next. This is known as negative drift and, of course, is not a serious defect provided that, at whatever focus setting is required, it remains constant during the projection of the reel of film. However, as the light intensity and consequently the heat or energy flux increases it becomes necessary to re-focus during the projection of a single reel of film. This has been designated as focus drift and is troublesome because it requires more attention by the projectionist in order to maintain a sharp image on the screen. As the light intensity is further increased, there is a softening of the focus and loss of detail which cannot be corrected by changing the focus setting. While this does not appear to affect the quality of the projected image to any noticeable degree, it is believed to be a preliminary to "in-and-out-of-focus." The "in-and-out-of-focus" phenomenon is where the curvature of the film during a single projection of a single flame changes from negative to positive in an unpredictable and uncontrollable manner. This, of course, makes it impossible for the projectionist to keep the screen image focused properly since this is not a consistent characteristic of each and every frame of a reel of film.

It is, therefore, an object of the invention to provide photographic film elements which are suitable for projection by high intensity arc light projectors. Another object is to provide cine photographic film elements which will not be adversely affected by such high-intensity arc light projectors. Yet another object is to provide photographic silver halide emulsion layers which have little or no tendency to blister or deteriorate under the influence of radiant energy. A further object is to provide a cine positive film which will have little or no tendency toward objectionable in-and-out-of-focus during operation. A still further object is to provide a cine positive film, the structural characteristics of the support of which are not deleteriously altered by the use of high-intensity arc light projectors.

It has been found that the above objects can be attained by the preparation and use of aqueous dispersions of silver halide in a water-permeable reversible protein protective colloid binding agent wherein 40% to 70% by weight of said colloid binding agent for the silver halide grains has been replaced by a butadiene/acrylonitrile copolymer containing 30% to 40% by weight of the acrylonitrile component. These copolymers generally have a molecular weight of 5,000 to in excess of 35,000 and even 50,000.

The novel silver halide dispersions or emulsions can be made in the conventional way by precipitating the silver halide in an aqueous solution of the water-permeable protein colloid, for instance, by admixing a water-soluble silver salt, e. g., silver nitrate, silver sulfamate, silver acetate or silver citrate, and a water soluble halide or mixture of halides, e. g., ammonium bromide, potassium chloride or potassium iodide or mixtures of two or three of such salts. The foregoing salts are generally admixed in the form of their aqueous solutions. The resulting emulsions or dispersions are then ripened, chilled or coagulated, shredded or extruded, and the shreds or extruded particles are then washed to remove soluble salts.

The aqueous dispersions or emulsions prepared as described in the previous paragraph can then be given a second digestion and the desired adjuvants added in preparing the emulsion for coating. At this time the emulsions which have a high concentration of silver halide can be diluted by the addition of an aqueous solution of additional water-permeable protein colloid and/or by the addition of an aqueous dispersion of the butadiene/acrylonitrile in such amount that the final emulsion contains 40% to 70% by weight of the protein binding agent of the butadiene/acrylonitrile copolymer.

The emulsion prior to coating thus may contain sulfur sensitizers, e. g., sodium sulfite, allyl isothiocyanide and allyl diethyl thiourea, a metal or metal salt sensitizer, e. g., a gold, ruthenium, rhodium, palladium, iridium or platinum salt or mixture of such salts or an iron or mercury salt. They may also contain sensitizing amounts of the polyoxyalkylene compounds described in U. S.

2,423,549, 2,441,389, 2,240,472 and/or stabilizing amounts of tetrazaindene or pentazaindene stabilizers as described in Z. für Wiss. Phot., 47 pp. 2–21 (1952), or other stabilizers, as well as coating aids, optical sensitizing dyes, e. g., cyanine and merocyanine dyes, etc.

When the photographic elements contain a plurality of photographic colloid-silver halide emulsion layers, each of them as well as any other water-permeable colloid layers will contain the above-described amount of butadiene/acrylonitrile copolymer in place of part of the gelatin or other colloid. Thus, a gelatin backing layer and/or an antiabrasion layer will have 40 to 70% of the gelatin substituted by the said copolymer.

The butadiene/acrylonitrile copolymer can be prepared by any conventional method for making such addition copolymers. They are preferably prepared in the form of an aqueous emulsion. A useful method is described in "Synthetic Rubber" by Whitby, pages 798–804, published by John Wiley & Sons, Inc., New York (1954). The copolymer in the requisite amount is added from aqueous dispersion to the aqueous colloid-silver halide emulsion which is then coated onto the photographic film base by any conventional coating method, for instance, from a gravity fed hopper, by skim coating, by means of a bead roller or by means of an extrusion hopper.

Replacement of 40% to 70% by weight of the gelatin or other water-permeable reversible protein protective colloid normally present in photographic films by the butadiene/acrylonitrile copolymers overcomes the difficulties of blistering and focusing during projection of the resulting silver image-containing photographic film to a surprising degree. Moreover, the copolymer does not seem to have any significant adverse effect on the sensitivity of the emulsion layers. To the extent that the quantity of natural sulfur sensitizers normally present in photographic gelatin is reduced by replacement with the copolymer, additional amounts of sulfur sensitizers can be added prior to coating.

In the examples which follow, energy flux in the film gate will be indicated as the mean net watts per square millimeter with the projector shutter running. Focus settings as described above are either negative or positive and will be indicated by the minus or plus number of mils the lens must be set in relation to the point where the lens would be set for proper focus if the film were perfectly planar.

Moreover, in the examples, the conditions of energy flux were much higher than those to which normal gelatin silver halide emulsions are commonly subjected because these normal silver-gelatin positive films are usually projected with a heat filter in front of the light source which decreases the energy flux approximately 40%. Consequently, in the trials of the following examples the all-gelatin emulsion control samples blistered and became useless before any in-and-out-of-focus characteristics could be observed. However, some focus flutter and in-and-out-of-focus was observed in the test samples because of the extreme conditions of energy flux.

The invention will now be illustrated in and by the following examples, which are carried out in the substantial absence of actinic light except during image exposure of the photographic elements.

*Example I*

In a gelatin silver iodobromide emulsion of the cine positive type which was made and digested according to conventional procedures, half of the gelatin was replaced with a butadiene/acrylonitrile copolymer containing approximately 33% by weight of acrylonitrile. The copolymer was added to the emulsion after digestion in the form of an aqueous dispersion. The emulsion, having an amount of binder of approximately 70 mg./dm.$^2$, was coated on the gelatin sublayer on a vinylidene chloride copolymer sublayer on a polyethylene terephthalate film having a thickness of approximately 4 mils of the type described in Alles et al., U. S. P. 2,627,088. The resulting film was exposed to a test pattern which is a line image and processed to a density of 2±0.3.

After processing several 35 millimeter strips of the resulting film to the above density, they were repeatedly projected in a high intensity arc projector with an energy flux in the film gate of approximately 0.52 watt/mm.$^2$. Under these conditions, the emulsion blistered to an observable extent after an average of 30 projections. The focus setting was −21 mils during the first projection, −1 mil at the third projection and +10 mils from the eighth projection on. Only an occasional focus flutter was observed during projection. A photographic element having an all gelatin emulsion layer projected under the same conditions blistered after only two projections and the focus setting went from −18 mils to −14 mils.

A similar photographic element having an emulsion wherein only 25% of the gelatin was replaced with the above copolymer also blistered after two projections and its focus setting changed from −18 mils to −14 mils. Blistering was markedly improved by the presence of an amount of the butadiene/acrylonitrile copolymer equal to the amount of gelatin present in the emulsion. Where only 25% of the gelatin in the emulsion was replaced with the copolymer there was no practical improvement in non-blistering. Because the control films began to blister after only two projections, "in-and-out-of-focus" and "focus drift" could not be observed.

*Example II*

A cine positive film similar to that described in Example I was prepared except that about 40% of the normal amount of the gelatin was replaced with the copolymer of Example I. The emulsion was coated so that the binder coating weight amounted to about 43 mg./dm.$^2$. The film was processed as in Example I and projected in a high intensity projector with an energy flux in the film gate of approximately 0.55 watt/mm.$^2$. The emulsion layer showed only slight blister after 9 projections and no indications of focus flutter or in-and-out-of-focus. The focus setting was −5 mils at the first projection and about +10 mils through the rest of the projections. An all-gelatin emulsion layer blistered during the first projection. Under milder conditions with an energy flux of about 0.45 watt/mm.$^2$, the test film was projected about 22 times before showing only slight blister. The focus setting changed from −6 mils during the first projection to +10 mils at the second projection and finally stabilized at approximately +15 mils. An all-gelatin emulsion layer blistered after only 3 projections. No focus flutter was observed and no in-and-out-of-focus was apparent.

*Example III*

A sensitized cine positive film was prepared similar to the one described in Example I but having 33⅓% of the gelatin replaced by the butadiene/acrylonitrile copolymer of Example I. The copolymer was added as an aqueous dispersion having 13.4% by weight solids. The emulsion was coated to a binder coating weight of 43 mg./dm.$^2$. The coated film was exposed and processed as described in Example I. The fresh fog was 0.01 and the aging fog was 0.01.

The photographic film was projected in a high intensity arc projector with an energy flux in the film gate of about 0.47 watt/mm.$^2$. Under these conditions, the emulsion layer began to go in-and-out-of-focus at the second projection and to blister after three projections. An all-gelatin emulsion layer projected under the same conditions blistered after only one projection.

*Example IV*

A cine positive film similar to that of Example I was made using the same gelatin to copolymer ratio but coated at a binder coating weight of 85 mg./dm.$^2$. The film was projected in a high intensity arc projector with an energy flux in the film gate of about 0.56 watt/mm.² The film was observed to blister at the tenth projection and the focus setting changed from −11 mils at the first projection to about +8 mils at the third projection and the film stabilized at this setting for the rest of the projection. No fluttering was observed. Under these conditions, the all-gelatin emulsion layer control blistered at the first projection. Under milder conditions, i. e., approximately 0.31 watt/mm.², the emulsion did not blister in 50 projections. During the 50 projections the focus setting changed from −19 mils at the first projection to −14 mils at the second, −7 mils at the 15th, −4 mils at the 30th, +2 mils at the 40th and +4 mils at the 50th. Under these milder conditions, the all-gelatin control fluttered badly and blistered after 20 projections.

*Example V*

A cine positive film similar to that in Example II was made except that the binder coating weight was raised from 43 to 70 mg./dm.² The exposed and processed film was projected with an energy flux in the film gate of about 0.51 watt/mm.² The emulsion showed slight blistering after 20 projections whereas the all-gelatin emulsions were blistered and destroyed during the first projection. The initial focus setting of −16 mils changed to +6 mils at the second projection and retained a value of +8 mils through the 20th projection. On further projection up to 100 times, occasional focus flutter and in-and-out-of-focus was observed. Under milder conditions of an energy flux of about 0.30 watt/mm.² the focus setting changed from −12 mils at the first projection to +15 mils at the 150th projection and the film stabilized at this setting up to 240 projections. A photographic film having an all-gelatin emulsion layer showed severe blister, focus flutter and in-and-out-of-focus at the 100th projection.

*Example VI*

A cine positive film similar to the one described in Example II but having a total binder coating weight of 58 mg./dm.² was projected with an energy flux in the film gate of about 0.51 watt/mm.² The emulsion layer blistered after 40 projections whereas the all-gelatin emulsion layer control was destroyed after one projection. The focus setting was −15 mils during the first projection, +2 mils at the second projection and stabilized at +10 mils from the tenth projection through the 40th. Occasional focus flutter was observed. Under milder conditions of about 0.30 watt/mm.² in the gate, the test film did not blister in 100 projections. At the first projection the focus setting was −13 mils, +2 mils at the 9th projection, +3 mils at the 20th, and stabilized at +5 mils through the 100th projection. Occasionally the film fluttered slightly.

*Example VII*

A silver iodobromide emulsion of the cine positive variety containing equal amounts of gelatin and the copolymer of Example I was coated on the film base set forth in that example to a coating weight of 43 mg./dm.² The film base also had coated on its opposite surface a layer comprising equal quantities of gelatin and the butadiene-acrylonitrile copolymer of Example I to a coating weight of about 40 mg./dm.² When projected in a high intensity arc projector with an energy flux through the film gate of about 0.30 watt/mm.² the emulsion layer withstood 50 projections without blistering. The initial focus setting was −15 mils, became about +4 mils at the 10th projection and remained unchanged through the rest of the projections. No focus flutter or in-and-out-of-focus was observed. At an energy flux of .48 watt/mm.² the film assumed a focus setting of about +7 mils, but it did not show any focus flutter. A control film, having the same emulsion but an all gelatin backing layer of a coating weight of 40 mg./dm.² performed equally well with respect to blistering at both energy levels and the focus setting was about the same for both films. However, the all-gelatin backing did not prevent focus flutter or in-and-out-of-focus.

*Example VIII*

A silver iodobromide emulsion of the cine positive type as set forth in Example II was coated in an amount of binder of 43 mg./dm.² on the film base set forth as the test film in Example VII.

On repeatedly projecting this film with an energy flux in the film gate of approximately 0.51 watt/mm.² no blistering was observed until the 25th projection. The focus setting changed from −11 mils at the first projection to +5 mils at the second projection and stabilized at +6 mils for the remainder of the projection runs. No focus flutter was observed throughout the test. Under identical conditions, all-gelatin emulsion layers consistently blistered during the first projection. Under milder conditions, i. e., at an energy flux in the film gate of 0.30 watt/mm.², the test coating did not blister in over 100 projections. The focus setting was −13 mils at the 1st projection, −3 mils at the 4th, and +4 at the 10th projection. The film stabilized at this point for the rest of the projection runs and no fluttering was noticed. Under these conditions the all-gelatin emulsion control showed consistent focus flutter.

*Example IX*

To a gelatin silver iodobromide emulsion there was added, after digestion, an aqueous dispersion of the copolymer of Example I in an amount of 67% of copolymer by weight of the gelatin. The emulsion was coated as described in Example I and then the coated and dried film was brought to equilibrium in conditions of 10% relative humidity. The amount of curl was measured to the curl of a gelatin silver halide emulsion layer to which no copolymer had been added. Expressed in terms of diopters, the reciprocal of the radius of curvature measured in meters, the all-gelatin emulsion showed a curl of 70 diopters while the emulsion containing the butadiene-acrylonitrile copolymer showed a curl of only 23 diopters.

Upon projection of this test emulsion at a mean net energy flux of about 0.42 watt/mm.² the control showed a negative drift in focus setting from −13 mils at the first projection, +1 mil at the fifth projection, +6 mils at the 10th projection and +10 mils at the 15th projection. The test film showed a change from −16 mils at the first projection, −5 mils at the fifth projection, +2 mils at the 10th projection and 0 at the 15th projection. There was no evidence of blistering in either the control or the test film.

While the copolymer described in Example I contains acrylonitrile in a ratio of approximately 33%, copolymers having ratios varying from 30% to 40% acrylonitrile give similar improved results.

The butadiene/acrylonitrile copolymers may be made as taught on pages 798–804 in "Synthetic Rubber" by Whitby, published by John Wiley & Sons, Inc., New York (1954), by admixing them with an aqueous solution containing a suitable emulsifying agent, e. g., sodium dodecyl sulfate and an addition polymerization initiator, e. g., benzoyl peroxide, as disclosed therein. The copolymers may be mercaptan-modified, made by adding an alkyl mercaptan of 8 to 18 carbon atoms in an amount up to 1% by weight of the copolymer, as taught in such textbook. Suitable mercaptans are n-decyl, n-dodecyl, n-tetradecyl, n-hexadecyl and n-octadecyl mercaptans and mixtures of two or more of the same.

The following table summarizes the advantages of the use of the butadiene/acrylonitrile copolymer in photographic films to overcome the difficulties of blister and of focus both in gelatin emulsion layers and the backing layers. IOOF stands for in-and-out-of-focus.

EMULSION CONTAINS

| Backing Contains | 33% Copolymer | | 40% Copolymer | | 50% Copolymer | |
|---|---|---|---|---|---|---|
| | Blister | 100F | Blister | 100F | Blister | 100F |
| All-Gelatin | Slight | Yes | No | Yes | No | Yes. |
| 33% Copolymer | do | Yes | No | Yes | No | Yes. |
| 40% Copolymer | do | No | No | No | No | No. |
| 50% Copolymer | do | No | No | No | No | No. |

The invention is, of course, not limited to use in the preparation of cine positive emulsions but the butadiene/acrylonitrile copolymers are also useful in other types of photographic films where the negative or positive is used to make process negatives which are printed under high-intensity lights onto a photosensitive layer.

An advantage of the invention is that it provides improved photographic films which have little or no tendency to blister under the influence of high intensity radiant energy. Another advantage is that it provides improved cine positive films whereby the image-bearing films made therefrom are relatively free from a tendency toward focus drift during projection. A further advantage is that the photographic films can be made with the usual equipment and coating procedures. A still further advantage is that the films can be made from available copolymers which are relatively inexpensive. A still further advantage is that dependable photographic films of uniform quality can be made in a continuous manner. Still other advantages will be apparent from the above description.

What is claimed is:

1. A photographic water-permeable protein colloid-silver halide emulsion wherein 40 to 70% by weight of the binding agent for the silver halide grains is a butadiene/acrylonitrile copolymer containing 30 to 40% by weight of the latter component.

2. A photographic gelatino-silver halide emulsion wherein 40 to 70% by weight of the binding agent for the silver halide grains in a butadiene/acrylonitrile copolymer containing 30 to 40% by weight of the latter component.

3. A photographic gelatino-silver halide emulsion layer wherein 40 to 70% by weight of the gelatin binding agent for the silver halide grains has been replaced by a butadiene/acrylonitrile copolymer containing 30 to 40% by weight of the latter component.

4. An emulsion layer as set forth in claim 3 wherein the silver halide in the emulsion is silver iodobromide.

5. A photographic element comprising a hydrophobic film base bearing an emulsion layer as set forth in claim 4.

6. An emulsion layer as set forth in claim 3 wherein said copolymer is an n-alkylmercaptan-modified copolymer and the alkyl radical contains 8 to 18 carbon atoms.

7. An emulsion layer as set forth in claim 6 wherein said silver halide is silver iodobromide.

8. A photographic element comprising a hydrophobic film base bearing an emulsion layer as set forth in claim 7.

9. An element as set forth in claim 8 having a backing layer composed of 60 to 30% of gelatin and 40 to 70% of a butadiene/acrylonitrile copolymer containing 30 to 40% by weight of the latter component.

10. A photographic element comprising a hydrophobic film base bearing an emulsion layer as set forth in claim 6.

11. A photographic element comprising a hydrophobic film base bearing an emulsion layer as set forth in claim 3.

12. A photographic element comprising a hydrophobic film base bearing an emulsion layer as set forth in claim 3 and having a backing layer composed of 60 to 30% of gelatin and 40 to 70%, by weight, of a butadiene/acrylonitrile copolymer containing 30 to 40% by weight of the latter component.

13. A photographic element comprising a polyethylene terephthalate film base bearing a photographic gelatino-silver halide emulsion layer wherein 40 to 70% by weight of the gelatin binding agent for the silver halide grains has been replaced by a butadiene/acrylonitrile copolymer containing 30 to 40% by weight of the latter component.

14. An element as set forth in claim 13 wherein said silver halide is silver iodobromide.

References Cited in the file of this patent

UNITED STATES PATENTS 2,698,240    Alles et al. _____ Dec. 28, 1954